US007064538B2

(12) United States Patent
Kernhof

(10) Patent No.: US 7,064,538 B2
(45) Date of Patent: Jun. 20, 2006

(54) MAGNETIC SENSOR DIGITAL PROCESSING INTERFACE FOR ELECTRICAL MOTOR APPLICATION

(75) Inventor: Juergen Kernhof, Bissingen (DE)

(73) Assignee: Dialog Semiconductor GmbH, Kirchheim/Teck-Nabern (DE)

( * ) Notice: Subject to any disclaimer, the term of this patent is extended or adjusted under 35 U.S.C. 154(b) by 111 days.

(21) Appl. No.: 10/420,592

(22) Filed: Apr. 22, 2003

(65) Prior Publication Data

US 2004/0207392 A1 Oct. 21, 2004

(30) Foreign Application Priority Data

Apr. 17, 2003 (EP) ................... 03368029

(51) Int. Cl.
*G01B 7/30* (2006.01)
(52) U.S. Cl. .................. 324/207.25; 324/207.21; 324/207.2; 327/510
(58) Field of Classification Search .......... 324/207.25, 324/207.2, 207.21, 207.12, 260, 252, 251; 327/510, 511
See application file for complete search history.

(56) References Cited

U.S. PATENT DOCUMENTS

| | | | | |
|---|---|---|---|---|
| 4,791,366 | A | | 12/1988 | Suzuki et al. ................ 324/208 |
| 5,134,578 | A | * | 7/1992 | Garverick et al. .......... 708/605 |
| 5,436,858 | A | * | 7/1995 | Staver ........................ 708/313 |
| 5,561,660 | A | * | 10/1996 | Kotowski et al. ........... 370/215 |
| 5,861,745 | A | | 1/1999 | Herden .................... 324/207.2 |
| 5,880,586 | A | | 3/1999 | Dukart et al. ............ 324/207.2 |
| 5,936,561 | A | * | 8/1999 | Lee ............................ 341/143 |
| 6,041,336 | A | | 3/2000 | Steinlechner ................. 708/4 |
| 6,177,897 | B1 | * | 1/2001 | Williams, III ............... 341/150 |
| 6,304,074 | B1 | * | 10/2001 | Waffenschmidt ............ 324/202 |

(Continued)

FOREIGN PATENT DOCUMENTS

DE   3417016 C   12/1985

(Continued)

OTHER PUBLICATIONS

Logue, Aaron, ISA Interface Card-A Starting Point for Numerous Projects, Internet Publication, Oct., 1999, full document.*

*Primary Examiner*—Bot Ledynh
*Assistant Examiner*—Kenneth J. Whittington
(74) *Attorney, Agent, or Firm*—George O. Saile; Stephen B. Ackerman

(57) ABSTRACT

A system and methods for an interface for magnetic sensors to determine a rotational angle has been achieved. This interface can be used for magnetic sensors providing analog signals of the sine and cosine values of the angle to be determined. Analog signals are being processed in two measurement paths for the sine and cosine signal each until the desired angle is computed by a CORDIC processor. The first stage of the measurement path is the conversion of the sine and cosine signals from analog to digital by $2^{nd}$ order delta-sigma modulators with an over-sampling ratio. A low-pass decimation filter with $sinc^3$ characteristic performs the digital value computation. The next stage normalizes the digitized sine and cosine values to correct offset and scaling deviations. The CORDIC processor computes the angle by decomposing the desired rotation angle into iterations of pre-defined elementary rotation angles performing the rotation operation by simple shift-and-add operations and the magnitude of the vector using the output from the normalization stages.

37 Claims, 2 Drawing Sheets

U.S. PATENT DOCUMENTS

| | | | | |
|---|---|---|---|---|
| 6,448,763 B1 * | 9/2002 | Spellman | ................ | 324/207.21 |
| 6,479,987 B1 * | 11/2002 | Marx et al. | .............. | 324/207.2 |
| 6,534,969 B1 * | 3/2003 | Dietmayer | ............. | 324/207.12 |
| 6,758,398 B1 * | 7/2004 | Philyaw et al. | ............. | 235/454 |

FOREIGN PATENT DOCUMENTS

| | | |
|---|---|---|
| DE | 19502276 A | 8/1996 |
| EP | 599175 A | 6/1994 |

* cited by examiner

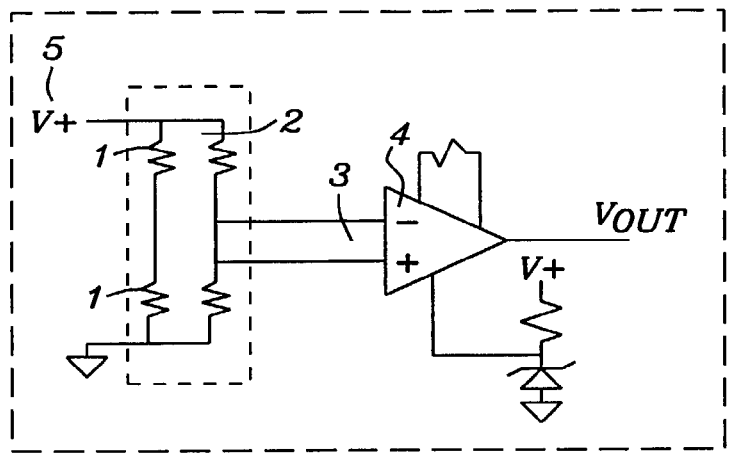
FIG. 1 – Prior Art
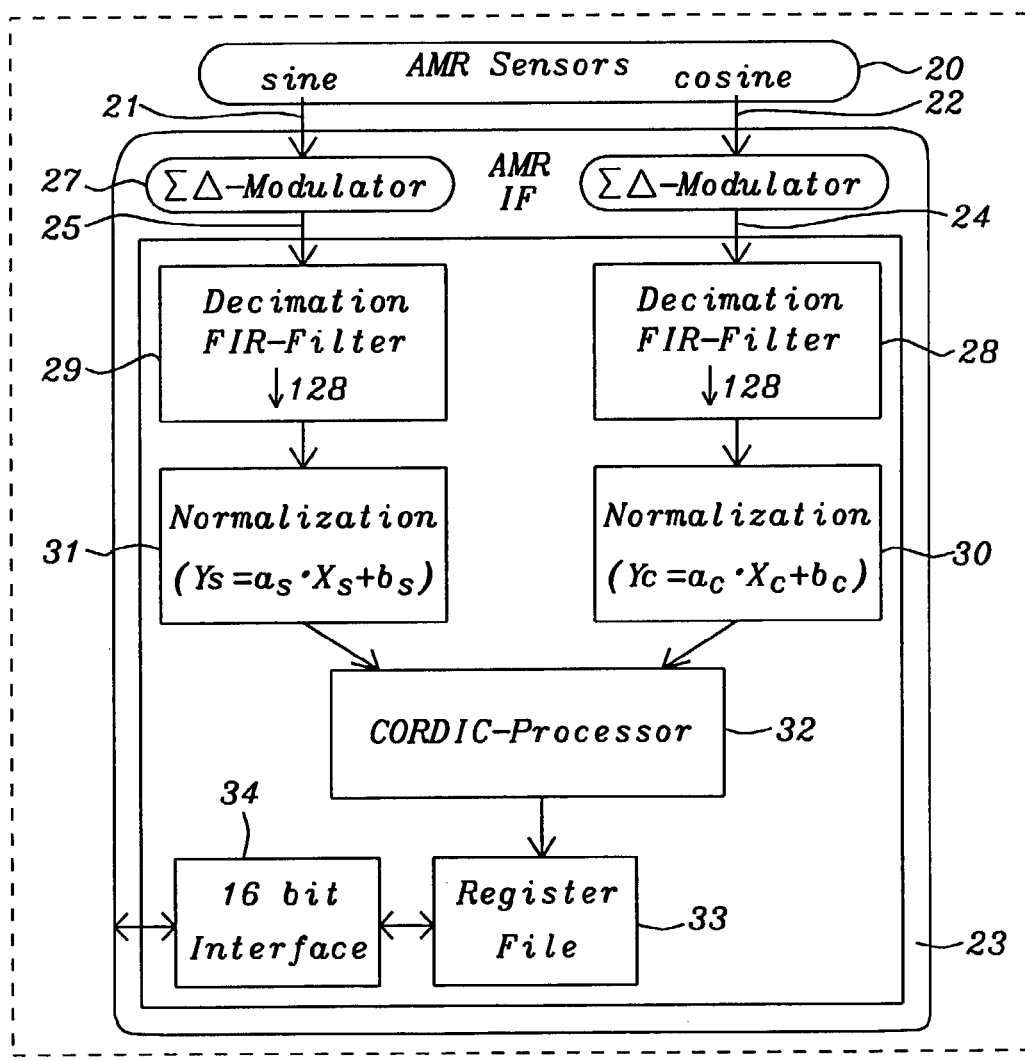
FIG. 2

MAGNETIC SENSOR DIGITAL PROCESSING INTERFACE FOR ELECTRICAL MOTOR APPLICATION

BACKGROUND OF THE INVENTION (1) Field of the Invention

The present invention relates generally to measuring devices for contactless, continuous determination of relative angular position, and more particularly, to an anisotropic magnetoresistive (AMR) sensor interface providing a continuous rotational angle detection including a angle velocity calculation.

(2) Description of the Prior Art

In prior art Hall sensors are often used to determine angular positions, as e.g. in automotive applications the movement and speed of an accelerator or the speed and direction of a driving shaft, etc. Hall sensors have the disadvantage that they can detect a single position of a magnetic field only; therefore multiple Hall sensors are required to determine an angle velocity or in other words, a movement of devices.

Anisotropic magnetoresistive (AMR) sensors are more flexible and sensitive compared to Hall sensors. They are made of a nickel-iron (Permalloy) thin film deposited on a silicon wafer and patterned as a resistive strip. The film's properties cause it to change resistance by 2%–3% in the presence of a magnetic field. FIG. 1 prior art shows a basic AMR circuit providing a differential output 3 (sign and magnitude) of a magnetic field. In the typical configuration shown, four of these resistors 1 are connected in a Wheatstone bridge 2 to permit measurement of the magnitude of the magnetic field along the direction of the axis. Said differential output 3 is amplified by amplifier 4. The power supply for the sensor provides the voltage $AV_{DD}$ 5 used to drive the sensor. The bandwidth is usually in the 15 MHz range. The reaction of the magnetoresistive effect is very fast and not limited by coils or excitation frequencies. One key benefit of AMR sensors is they can be bulk manufactured on silicon wafers and mounted in commercial integrated circuit packages. This allows magnetic sensors to be auto-assembled with other circuit and system components.

The challenges of the design of a system to determine angular positions comprises a continuous angle detection, including a continuous angle velocity calculation, a flexible signal processing and an approach to correct undesirable effects inherent in the sensor as bridge offset voltages and normalization of amplitudes.

There are various patents available dealing with said problems:

U.S. Patent (U.S. Pat. No. 4,791,366 to Suzuki et al) describes an apparatus for detecting an angle of rotation which comprises a rotary magnet having four poles, two magnetic sensors of a ferromagnetic material disposed over the periphery of the rotary magnet so as to face the magnetic poles of the rotary magnet and to have a phase difference of $3\pi/8$ therebetween, a signal generating portion for applying the magnetic sensors of a ferromagnetic material with a first and a second sine-wave signals having a phase difference of $\pi/2$ in electrical angle therebetween, a synthesizing portion for synthesizing signals output from both of first magnetic sensor of a ferromagnetic material and second magnetic sensor of a ferromagnetic material thereby to output a synthesized signal with a phase difference corresponding to an angle of rotation θ from the first sine-wave signal, and a rotational angle detecting portion for detecting the angle of rotation based on the phase difference U.S. Patent (U.S. Pat. No. 5,880,586 to Dukart et al.) shows an apparatus for determining rotational position of a rotatable element without contacting it including a sensor device having two Hall or AMR sensor elements for sensing a magnetic field of magnetic field strength generated by or influenced by the rotational position of the rotatable element and for producing output signals according to the magnetic field and thus the rotational position of the rotatable element. In order to easily detect the absolute rotational position of the rotatable element, the sensor device is constructed and positioned with respect to the rotatable element so that in every rotational position the field lines from the rotatable element extend at right angles to the sensor structures defined by the direction of an alternating current in the sensor elements. Using different embodiments of an electronic evaluation circuit, the direction components of the magnetic field are evaluated to determine the rotational position by comparing the input current to one of the sensors and the sum of the output signals of the respective sensor elements. Either sinusoidal or rectangular alternating voltages or direct voltages are input to the sensor elements U.S. Patent (U.S. Pat. No. 5,861,745 to Herden) discloses a measuring device for contactless determination of a relative angular position including a stator provided with slot-like stator air gaps, a rotor rotatable relative to the stator with a main gap between it and the stator and a Hall element arranged in at least one of the stator air gaps. Two ring magnets having magnetic polarities opposite to each other are provided in the interior wall of the stator. To measure a rotational angle of greater than ±75 degree with a linear response measurement curve, the first ring magnet extends around the rotor over an angular range of greater than 180.degree. When the null point of the magnetic induction B is shifted to the beginning of the linear range of the mechanical measuring range, particularly small rotation angles can be measured with a comparatively reduced measurement error.

SUMMARY OF THE INVENTION

A principal object of the present invention is to achieve a system and a method for an interface for magnetic sensors to determine continuously rotational angles.

A further object of the present invention is to achieve a system and a method for an interface for magnetic sensors to determine continuously rotational angles having a single sensor system and a flexible signal processing.

Another further object of the present invention is to achieve an approach for said interface including a normalization stage to correct offset and amplitude deviations.

In accordance with the objects of this invention a system for an interface for magnetic sensors to determine an angle of rotation has been achieved. Said system comprises an arrangement of magnetic sensors providing sine and cosine values of the angle to be determined, two identical measurement paths to process said sine and cosine values each, comprising a pair of delta-sigma modulators to perform amplification and analog-to-digital conversion of said sine and cosine values, a pair of decimation filters performing the filtering and down-sampling of the delta-sigma modulator bit streams, and a pair of a normalization stages performing the processing of normalization parameters. Furthermore said system comprises a processor to compute the angle to be determined using the output from said pair of normalization stages, a register file to store the results of said processor, and a processor interface to external devices.

In accordance with said objects of the invention a system for an interface for magnetic sensors to determine an angle of rotation has been achieved. Said system comprises an arrangement of anisotropic magnetoresisitive (AMR) sensors providing sine and cosine values of the angle to be determined, two identical measurement paths to process said sine and cosine values each, comprising a pair of second order delta-sigma modulators operating with an over-sampling ratio to perform amplification and analog-to-digital conversion of said sine and cosine values, a pair of low-pass decimation filters having a sinc$^M$ characteristic performing the filtering and down-sampling of the delta-sigma modulator bit streams, and a pair of a normalization stages using offset and scaling normalization parameters. Furthermore said system comprises a COordinate Rotational Digital Computer (CORDIC) processor to compute the angle to be determined by decomposing the desired rotation angle into iterations of pre-defined elementary rotation angles performing the rotation operation by simple shift-and-add operations replacing multiplication/division operations and the magnitude of the vector MAG=$\sqrt{\sin^2+\cos^2}$ using the output from said pair of normalization stages, a register file to store said rotation angle and said vector magnitude, and a 16-bit peripheral bus interface of a micro-controller.

In accordance with said objects of the invention a method for an interface for magnetic sensors to determine an angle of rotation has been achieved. Said method comprises providing an arrangement of magnetic sensors providing sine and cosine values of said rotational angle, two measurement paths comprising a pair of delta-sigma modulators, a pair of decimation filters and a pair of normalization stages, a processor, a register file, and a processor interface to external devices. The steps of said method are to perform analog-to digital conversion of sine and cosine values provided by magnetic sensors, to perform low-pass filtering and down-sampling of digitized bit stream, to normalize sine and cosine values to correct offset and scaling deviations, to compute desired rotation angle and magnitude of vector MAG=$\sqrt{\sin^2+\cos^2}$ and to shift computed values of rotation angle and vector magnitude into a register file.

BRIEF DESCRIPTION OF THE DRAWINGS

In the accompanying drawings forming a material part of this description, there is shown:

FIG. 1 prior art shows principally the basic elements of an AMR circuit.

FIG. 2 shows a functional block diagram of a preferred embodiment of an AMR sensor interface invented.

DESCRIPTION OF THE PREFERRED EMBODIMENTS

Figure 3:
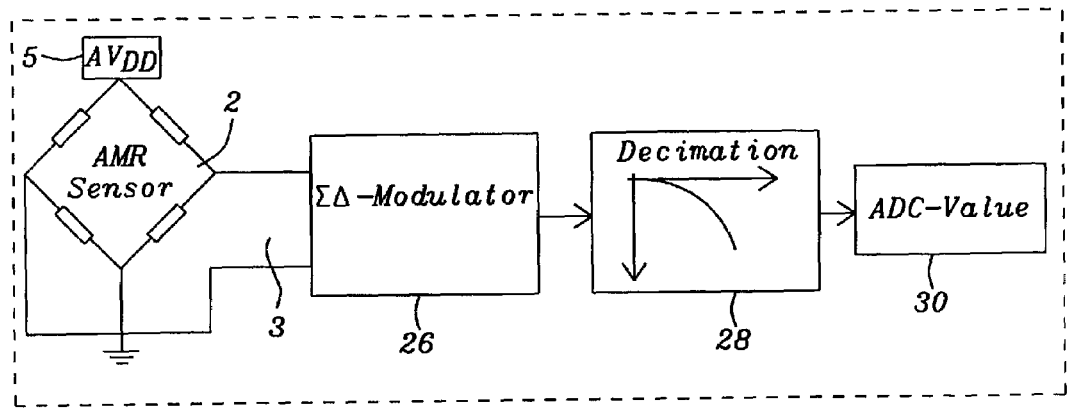
FIG. 3 shows a preferred embodiment of an AMR sensor path including the second order delta sigma modulator architecture.

The preferred embodiments disclose a system to determine continuously angle positions including an angle velocity calculation using anisotropic magnetoresistive (AMR) sensors.

FIG. 2 shows a functional block diagram of a preferred embodiment of the AMR sensor interface 23 invented. Details of the components of said interface will be described later. Said interface calculates an angle position by means of the sine 21 and cosine 22 signals. Said interface 23 is receiving sine and cosine values of the position to be measured from AMR sensors 20 connected in a Wheatstone bridge.

Two independent paths 24 and 25 are provided to process said sine 21 and cosine 22 signals. Said two paths 24 and 25 are closely synchronized. Said sine and cosine values are converted from analog to digital values using two second order delta sigma modulators 26 and 27. A pair of low-pass decimation filters 28 and 29 performs the digital value computation converting the bit stream of the delta sigma modulators 26 and 27 into binary values. The following normalization stage 30 and 31 provides totally four registers for the normalization parameters offset and scale for both the sine and cosine signal paths. Processor 32 computes the angle to be determined, using both results of the sine and cosine path. The value of $$\tan x = \frac{\sin x}{\cos x}$$

is computed and stored in register. An interface 34 to a microcontroller is provided for the computation for additional values as angle speed, etc.

Delta Sigma modulation is a technique used to generate a coarse estimate of a signal using a small number of quantization levels and a very high sampling rate. The finite number of quantization levels introduces "quantization" noise into the system, and a special characteristic of a Delta Sigma modulator is its ability to "push" this noise into higher frequencies. This allows the use of Digital Signal processing (DSP) techniques to "decimate" the sequence and produce a more precise bit representation of the input. DSP techniques are innovative development methods based on mathematical models and dedicated algorithms. They serve to manipulate and analyze signals of all kinds (like electrical sensor signals, coded information, etc.).

FIG. 3 shows a preferred embodiment of an AMR sensor path including the second order delta sigma modulator architecture. In order to avoid unnecessary complexity only components and related numbers of the cosine path of FIG. 2 are shown. In this context both sine and cosine path are identical. As shown in FIG. 1 prior art the AMR sensors are connected in a Wheatstone bridge. The internal reference voltages are derived from the voltage AV$_{DD}$ 5 of the power supply of the sensor to achieve a ratio metric measurement system. The bridge output 3 is differentially amplified by the internal capacitor scaling of the sigma delta modulator 26 usually in the order of magnitude of 5 to 20 and can be adjusted by the internal reference of said sigma delta modulator.

Said amplified bridge output is continuously sampled by the sigma delta-modulator 26. The analog-to-digital conversion is implemented by using a second order delta sigma modulation with an over-sampling ratio of 128 or with an over-sampling frequency of 500 kHz. A low-pass decimation filter 28 with sinc$^3$ characteristics performs the digital value computation.

The decimation filter 28 converts the bit stream of the delta sigma-modulator 27 into a binary value B. This binary value B depends on the ratio of the internal reference voltage V$_{ref}$ and the differential input voltage V$_{INDIFF}$ 3 (input to the amplifier 4) with the number of resolution bits n:

$$B = B_{off} + 2^{n-1} + \frac{Vindiff}{V_{ref}} \times \alpha \times 2^{n-2},$$

wherein $B_{off}$ is an internal binary offset and has the ideal value of zero, the factor $\alpha$ describes an amplification error and has an ideal value of 1. Both parameters depend on mismatching and drift effects of an analog circuit implementation.

The decimation filter 28 performs the low-pass filtering and down sampling of the delta-sigma-modulator bit stream. The first stage of the decimation filter is a sinc³ comb-filter forming a cascade of comb filters, which is a sinc³ operation. A comb-filter reduces the sampling rate to an intermediate frequency. If it is necessary, additional e.g. infinite impulse response (IIR) half-band filter stages can improve the conversion accuracy.

The structure of a finite impulse response (FIR) filter is a weighted, tapped delay line. The filter design process involves identifying coefficients that match the frequency response specified in the system. The design of the filter depends on the desired frequency response, sample rate and precision required.

The general transfer function of sinc$^M$ comb filter is given by $$H(z) = \left(\frac{1-z^{-D}}{1-z^{-1}}\right)^M,$$

wherein D is the internal length of the delay path in terms of registers or clock cycles, M is the order of the operation.

A third order decimation-by 128 FIR filter has the transfer function $$H(z) = \left(\frac{1-z^{-128}}{1-z^{-1}}\right)^3,$$

In a preferred embodiment of a AMR-sensor interface the 384-tap FIR filter operation of the decimation stage, having an internal length of the delay path D of 128 and an order M of 3, can be written by using filter coefficients:

$$Y = \sum_{n=0}^{383} h_n \times x(n).$$

The filter coefficients can be easily calculated with $$h_n = \frac{n \times (n+1)}{2}, \quad \text{for } n = (0 \ldots 127),$$

$h_n = 8256 + (n-128) \times (255-n)$, for $n = (128 \ldots 255)$, $$h_n = \frac{(383-n) \times (384-n)}{2}, \quad \text{for } n = (256 \ldots 383).$$

The normalization stage 30 has 2 registers for the cosine path and 2 equivalent registers for the sine path. They are required for the normalization parameters offset and scale for both the sine and cosine signal path.

The normalization is defined as follows:

$X_{new} = (X_{old} - \text{Off}_{sin}) \times SC_{sin}$ and $Y_{new} = (Y_{old} - \text{Off}_{cos}) \times SC_{cos}$ wherein $X_{new}$ is the normalized value of the raw sine value $X_{old}$ as output of the decimation stage and $Y_{new}$ is the normalized value of the raw cosine value $Y_{old}$. $\text{Off}_{sin}$ and $\text{Off}_{cos}$ are the offset correction values for the raw sine respective the raw cosine values; $SC_{sin}$ and $SC_{cos}$ are the scaling factors for the raw sine respective raw cosine values.

The multiplication with said scaling factors and offset subtraction with said offset correction values is performed in 16 shift and add cycles by using a 32-bit accumulator. The offset correction values $\text{Off}_{sin}$ and $\text{Off}_{cos}$ have to be two's complement values. The final result of said offset subtraction and multiplication is shifted by 2 and truncated to 16 bits and defines the input values for the processor 32.

The magnitude of the signal after the normalization is $$MAG = \sqrt{x^2 + y^2}$$

wherein X and Y are the values of sine respective for cosine after the normalization. Said calculated magnitude is put into one of the two output registers 33.

The COordinate Rotational Digital Computer (CORDIC) processor 32 computes the angle PHI and amplitude value MAG of the vector given by the normalization stage 30 and 31 within 14 iterations of the algorithm. For each sample pair produced by the normalization stages 30 and 31 the processor 32 calculates the angle PHI and magnitude MAG and stores them in two registers respectively in the register file 33. The completion of a calculation is reported by setting a "ready" bit in the status register and can also be traced with an interrupt signal.

The CORDIC algorithm is a well-known Digital Signal Processing (DSP) algorithm for computing vector rotation and trigonometric functions. It is a time and space efficient algorithm mainly to calculate the sine and cosine of a given angle or to calculate, as required in our preferred embodiment, to calculate an angle of given sine and cosine values. The main concept of the CORDIC algorithm is to decompose the desired rotation angle into iterations of pre-defined elementary rotation angles. The rotation operation can be performed by simple shift-and-add operations replacing multiplication/division operations. The simplicity and regularity of CORDIC processor makes it very suitable for Very Large Scale Integrated (VLSI) circuit implementation.

For the computation of the angle PHI said CORDIC algorithm is used by the processor using a lookup table comprising the iteration steps and angles in degrees. Based on a sample rate of 4 kHz the internal delays generated by decimation, normalization and processor computation takes less than 400 µsec.

In a preferred embodiment the connection to external devices is provided by a 16-bit peripheral bus interface 34 of a micro-controller.

Figure 4:
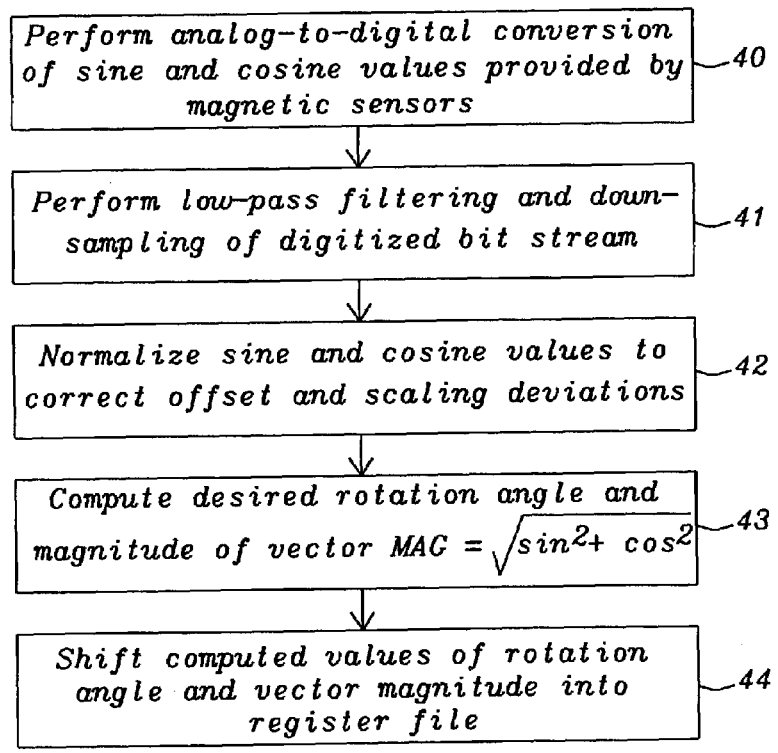
FIG. 4 shows a flowchart of the method to achieve a magnetic sensor interface

FIG. 4 shows a flowchart of the method to achieve a magnetic sensor interface. The first step 40 shows that the analog values of sine and cosine of the rotational angle to be determined are being converted to digital values. In the next step 41 low-pass filtering and down-sampling of the digitized bit stream is performed. The following step 42 shows that said digitized values are normalized to correct offset and scaling deviations followed by step 43 in which the desired rotation angle and the magnitude of a vector using the equation $MAG=\sqrt{\sin^2+\cos^2}$ is computed. In the last step 44 said computed value of the desired rotation angle and of said vector magnitude is shifted into a register file.

For those skilled in art it is obvious that the interface described above could be used with other types of magnetic sensors providing sine and cosine values as e.g. giant magnetoresistive (GMR) sensors, HALL sensors, etc. For these other applications only a different input scaling is required.

While the invention has been particularly shown and described with reference to the preferred embodiments thereof, it will be understood by those skilled in the art that various changes in form and details may be made without departing from the spirit and scope of the invention.

What is claimed is:

1. A system for an interface for magnetic sensors to determine an angle of rotation comprising:
   an arrangement of magnetic sensors providing analog sine and cosine values of the angle to be determined;
   two identical measurement paths to process said sine and cosine values each, comprising each a delta-sigma modulator to perform amplification and analog-to-digital conversion of said sine and cosine values, a decimation filter performing filtering and down-sampling of the delta-sigma modulator bit stream, a normalization stage performing the processing of normalization parameters having input and output wherein the input is the output of said decimation filter and the output is the input of a processor to compute the angle to be determined;
   said processor to compute the angle to be determined using the output from both said normalization stages;
   a register file to store the results of said processor; and
   a processor interface to external devices having as input the output of said register file.

2. The system of claim 1 wherein said magnetic sensors are anisotropic magnetoresistive (AMR) sensors.

3. The system of claim 1 wherein said magnetic sensors are giant magnetoresistive (GMR) sensors.

4. The system of claim 1 wherein said magnetic sensors are Hall sensors.

5. The system of claim 1 wherein said pair of delta-sigma modulators are second order delta-sigma modulators.

6. The system of claim 5 wherein said delta-sigma modulators are operating with an over-sampling ratio.

7. The system of claim 6 wherein said over-sampling ratio amounts to 128.

8. The system of claim 1 wherein said decimation filters are low-pass filters.

9. The system of claim 8 wherein said low-pass filters have a $sinc^3$ characteristic.

10. The system of claim 1 wherein said normalization stages are providing offset correction and scaling correction.

11. The system of claim 10 wherein said normalization stages are having two registers for cosine path and two registers for sine path each for offset correction and scale factors for sine and cosine.

12. The system of claim 1 wherein said processor is a COordinate Rotational Digital Computer (CORDIC) processor.

13. The system of claim 1 wherein said processor calculates, additionally to the desired angle, the magnitude of the vector provided by the normalization stages following the equation $MAG=\sqrt{\sin^2+\cos^2}$.

14. The system of claim 1 wherein said processor decomposes the desired rotation angle into iterations of pre-defined elementary rotation angles performing the rotation operation by simple shift-and-add operations replacing multiplication/division operations.

15. The system of claim 14 wherein said processor is using a lookup table to accelerate the iterations performed to compute the desired angle.

16. The system of claim 1 wherein said processor interface is a 16-bit peripheral bus interface of a micro-controller.

17. A system for an interface for magnetic sensors to determine an angle of rotation comprising:
   an arrangement of anisotropic magnetoresisitive (AMR) sensors providing analog sine and cosine values of the angle to be determined;
   two identical measurement paths to process said sine and cosine values each, comprising each a second order delta-sigma modulator operating with an over-sampling ratio to perform amplification and analog-to-digital conversion of said sine orrespective cosine values, a low-pass decimation filter having a $sinc^M$ characteristic performing the filtering and down-sampling of the delta-sigma modulator bit stream, a normalization stage using offset and scaling normalization parameters having input and output wherein the input is the output of said low-pass decimation filter and the output is the input of a processor to compute the angle to be determined;
   a COordinate Rotational Digital Computer (CORDIC) processor to compute the angle to be determined by decomposing the desired rotation angle into iterations of pre-defined elementary rotation angles performing the rotation operation by simple shift-and-add operations replacing multiplication/division operations and the magnitude of the vector $MAG=\sqrt{\sin^2+\cos^2}$ using the output from both said normalization stages;
   a register file to store said rotation angle and said vector magnitude; and
   a 16-bit peripheral bus interface of a micro-controller. having as input the output of said register file.

18. The system of claim 17 wherein said over-sampling ratio amounts to 128.

19. The system of claim 17 wherein said $sinc^M$ characteristic is a $sinc^3$ characteristic.

20. A method for an interface for magnetic sensors to determine an angle of rotation comprising:
   providing an arrangement of magnetic sensors providing sine and cosine values of said rotational angle, two measurement paths comprising a pair of delta-sigma modulators, a pair of decimation filters and a pair of normalization stages, further a processor, a register file and a processor interface to external devices;
   perform first analog-to digital conversion of sine and cosine values provided by magnetic sensors; then
   perform low-pass filtering and down-sampling of digitized bit stream; then
   normalize sine and cosine values to correct offset and scaling deviations; then
   compute desired rotation angle; and shift computed values of rotation angle and vector magnitude into register file.

21. The method of claim 20 wherein said magnetic sensors are anisotropic magnetoresistive (AMR) sensors.

22. The method of claim 20 wherein said magnetic sensors are giant magnetoresistive (GMR) sensors.

23. The method of claim 20 wherein said magnetic sensors are Hall sensors.

24. The method of claim 20 wherein said pair of delta-sigma modulators are second order delta-sigma modulators.

25. The method of claim 24 wherein said delta-sigma modulators are operating with an over-sampling ratio.

26. The method of claim 25 wherein said over-sampling ratio amounts to 128.

27. The method of claim 20 wherein said decimation filters are low-pass filters.

28. The method of claim 27 wherein said low-pass filters have a $sinc^3$ characteristic.

29. The method of claim 20 wherein said normalization stages are providing offset correction and scaling correction.

30. The method of claim 29 wherein said normalization stages are having two registers for cosine path and two registers for sine path each for offset correction and scale factors for sine and cosine.

31. The method of claim 20 wherein said processor is a COordinate Rotational Digital Computer (CORDIC) processor.

32. The method of claim 20 wherein said processor calculates, additionally to the desired angle, the magnitude of the vector provided by the normalization stages following the equation $MAG=\sqrt{sin^2+cos^2}$.

33. The method of claim 20 wherein said processor decomposes the desired rotation angle into iterations of pre-defined elementary rotation angles performing the rotation operation by simple shift-and-add operations replacing multiplication/division operations.

34. The method of claim 33 wherein said processor is using a lookup table to accelerate the iterations performed to compute the desired angle.

35. The method of claim 20 wherein said processor interface is a 16-bit peripheral bus interface of a microcontroller.

36. The system of claim 11 wherein said normalization is performed according to the equations:

$$X_{new}=(X_{old}-Off_{sin}) \times SC_{sin} \text{ and}$$

$$Y_{new}=(Y_{old}-Off_{cos}) \times SC_{cos}$$

wherein $X_{new}$ is the normalized value of the raw sine value $X_{Old}$ as output of the decimation stage and $Y_{new}$ is the normalized value of the raw cosine value $Y_{old}$, $Off_{sin}$ and $Off_{cos}$ are the offset correction values for the raw sine respective the raw cosine values, and $SC_{sin}$ and $SC_{cos}$ are the scaling factors for the raw sine respective raw cosine values.

37. The method of claim 30 wherein said normalization is performed according to the equations:

$$X_{new}=(X_{old}-Off_{sin}) \times SC_{sin} \text{ and}$$

$$Y_{new}=(Y_{old}-Off_{cos}) \times SC_{cos}$$

wherein $X_{new}$ is the normalized value of the raw sine value $X_{old}$ as output of the decimation stage and $Y_{new}$ is the normalized value of the raw cosine value $Y_{old}$, $Off_{sin}$ and $Off_{cos}$ are the offset correction values for the raw sine respective the raw cosine values, and $SC_{sin}$ and $SC_{cos}$ are the scaling factors for the raw sine respective raw cosine values.

* * * * *